US007002777B2

(12) United States Patent
Ogawa et al.

(10) Patent No.: US 7,002,777 B2
(45) Date of Patent: Feb. 21, 2006

(54) TAPE DRIVE HEAD WITH LOWER CORE LAYER SIDE INCLINED AT ANGLE EQUAL TO OR GREATER THAN AZIMUTH ANGLE AND ALIGNED WITH UPPER CORE LAYER EDGE

(75) Inventors: Kazushi Ogawa, Kanagawa (JP); Tadashi Ozue, Kanagawa (JP); Teiichi Miyauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 10/673,004

(22) Filed: Sep. 26, 2003

(65) Prior Publication Data

US 2005/0068674 A1   Mar. 31, 2005

(30) Foreign Application Priority Data

Oct. 4, 2002  (JP) ............................. 2002-292862

(51) Int. Cl.
  *G11B 5/31* (2006.01)
  *G11B 5/52* (2006.01)
  *G11B 21/04* (2006.01)

(52) U.S. Cl. ..................... 360/126; 360/84; 360/271
(58) Field of Classification Search ............... 360/126, 360/317, 84, 270, 282
See application file for complete search history.

(56) References Cited

U.S. PATENT DOCUMENTS

| 4,799,118 A | * | 1/1989 | Yamada et al. ............ 360/126 |
| 4,970,616 A | * | 11/1990 | Ramaswamy ............... 360/122 |
| 5,285,340 A | * | 2/1994 | Ju et al. ..................... 360/126 |
| 5,633,771 A | * | 5/1997 | Yoda et al. ................. 360/317 |
| 5,639,509 A | * | 6/1997 | Schemmel .................. 360/126 |
| 5,801,908 A | * | 9/1998 | Akiyama et al. ........... 360/313 |
| 5,949,625 A | * | 9/1999 | Sato et al. .................. 360/126 |
| 6,069,775 A | * | 5/2000 | Chang et al. ............... 360/126 |
| 6,362,934 B1 | * | 3/2002 | Hungerford et al. ........ 360/121 |
| 2001/0017751 A1 | * | 8/2001 | Miyazaki et al. ........... 360/317 |
| 2002/0063992 A1 | * | 5/2002 | Kim et al. ................... 360/125 |

FOREIGN PATENT DOCUMENTS

| JP | 04103009 A | * | 4/1992 |
| JP | 10261207 A | * | 9/1998 |

* cited by examiner

*Primary Examiner*—Craig A. Renner
(74) *Attorney, Agent, or Firm*—Sonnenschein, Nath & Rosenthal LLP

(57) ABSTRACT

A thin film magnetic head, in which: a magnetic gap thereof is disposed slantingly relative to a direction orthogonal to a scanning direction of the head corresponding to an azimuth angle; an upper magnetic core layer is positioned on a leading side preceding a lower magnetic core layer in a scanning direction of the head, a protrusion on the lower magnetic core layer has an inclined side surface inclined at an angle equal to or greater than the azimuth angle at least on one side surface in a direction of a track width thereof, and at least one edge of a side adjacent to the magnetic gap of a protrusion on the upper magnetic core layer is aligned on a line drawn extending from the inclined side surface of the lower magnetic core layer, thereby suppressing occurrence of side erasing in a magnetic recording medium during azimuth recording.

8 Claims, 12 Drawing Sheets

LEADING SIDE ←——→ TRAILING SIDE

SCANNING DIRECTION OF HEAD

SCANNING DIRECTION OF HEAD

FIG. 16A
FIG. 16B
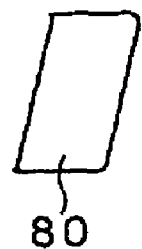
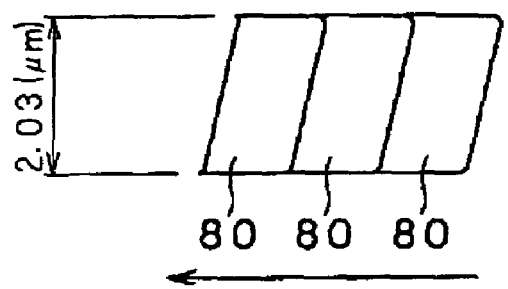
SCANNING DIRECTION OF HEAD
FIG. 17A
FIG. 17B
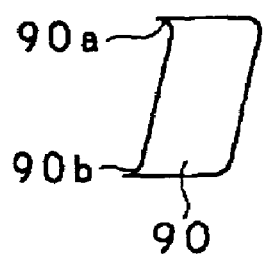
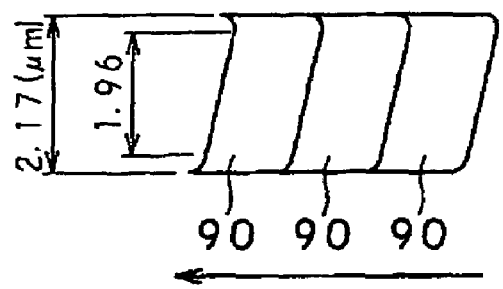
SCANNING DIRECTION OF HEAD

LEADING SIDE ⟷ TRAILING SIDE

TAPE DRIVE HEAD WITH LOWER CORE LAYER SIDE INCLINED AT ANGLE EQUAL TO OR GREATER THAN AZIMUTH ANGLE AND ALIGNED WITH UPPER CORE LAYER EDGE

CROSS REFERENCES TO RELATED APPLICATIONS

The present document is based on Japanese Priority Document JP 2002-292862, filed in the Japanese Patent Office on Oct. 4, 2002, the entire contents of which being incorporated herein by reference.

BACKGROUND OF THE INVENTION

1. Field of the Invention

The present invention relates to a thin film magnetic head constructed by laminating component parts such as a magnetic core, a coil and the like on a substrate using a thin film forming process, and a magnetic tape drive including this thin film magnetic head as a recording/reproducing head for recording/reproducing signals on and from a recording tape.

2. Description of Related Art

Conventionally, as a recording head for recording signals on a magnetic recording medium, a so-called bulk type magnetic head has been employed, which forms a magnetic circuit therein by disposing a pair of magnetic cores made of a magnetic material opposite to each other to form a small magnetic gap therebetween, and by winding coils around the pair of the magnetic cores for generating a magnetic field passing therethrough.

Further, along with the recent advancement in the high density recording, a so-called metal-in-gap (MIG) type magnetic head has been used in practice, in which a metal magnetic thin film with a high saturation magnetic flux density is deposited on opposed surfaces of a pair of magnetic cores made of ferrite or the like, which are, then, disposed adjacent to each other via a nonmagnetic film to provide a magnetic gap therebetween.

Generally, the recording head supplies a current in response to a recording signal to its coil, then a magnetic field generated from the coil allows its magnetic flux to pass through the pair of magnetic cores, thereby producing a recording magnetic field across the magnetic gap so that by applying this recording magnetic field to the magnetic recording medium, the signal is recorded thereon.

By the way, in this type of the recording head, in order to meet with a demand for a higher density recording capability, it has become increasingly important to have a narrower track width and improve accuracy of processing of this track width. However, as there is a limit in the manufacture of the aforementioned magnetic head using a micro fabrication technique, it has become increasingly difficult further to a narrower the track width corresponding to the demand for the higher density recording capability.

Therefore, a so-called thin film magnetic head has been proposed as a recording head capable of meeting with the demand for the higher density recording capability, which can be constructed by laminating various component parts on a substrate using a thin film process. This type of the thin film magnetic head has such advantages that, as their constituting elements such as a magnetic core, a coil and the like can be formed by a thin film forming method such as plating, sputtering, ion milling or the like, advantageous micro fabrication of narrower tracks, a narrower gap or the like becomes easier, thereby enabling to reduce the size of the device and improve the recording density in the magnetic recording medium.

An exemplary construction of the thin film magnetic head will be described with reference to FIGS. 19, 20 and 21.

This thin film magnetic head 100 is fabricated by laminating a lower magnetic core layer 102 and an upper magnetic core layer 103 on a substrate 101, which form a magnetic circuit. Each of the lower magnetic core layer 101 and the upper magnetic core layer 103 has a protrusion 102a and a protrusion 103a, respectively, formed at its end on the side of a medium facing surface 100a opposing a magnetic recording medium, protruding with each predetermined track widths Tw1' and Tw2', wherein by positioning the protrusions 102a and 103a via a nonmagnetic layer 104 oppositely and adjacent to each other in the direction of lamination, a magnetic gap G' is formed. Further, at its other end remote from the medium facing surface 100a in a depth direction therefrom, the lower magnetic core layer 102 and the upper magnetic core layer 103 are connected to form a back gap. Then, a thin film coil 105 is formed between the lower magnetic core layer 102 and the upper magnetic core layer 103 in a state being wound around this back gap and embedded in the nonmagnetic layer 104. An end of the thin film coil 105 at an inner periphery of the coil and the other end thereof at an outer periphery of the coil are extended externally in an opposite direction from the medium facing surface 100a to external connection terminals 105a and 105b for connection with an external circuit. Further, as an uppermost layer of the substrate 101, a protection layer 106 is provided to cover the whole surface area excepting a portion where the external connection terminals 105a and 105b of the thin film coil 105 are exposed.

Further, among this type of thin film magnetic head 100, in order to meet with a demand for a still more improved high density recording capability, there is such one as shown in FIG. 22, in which, in addition to its narrowed track width, its lower magnetic core layer 102 has a protrusion 102b protruding therefrom adjacent and corresponding to a protrusion 103a of a upper magnetic core layer 103. In this thin film magnetic head 100, by counter-positioning the protrusion 102b on the lower magnetic core layer 102 corresponding to the protrusion 103a on the upper magnetic core layer 103 adjacent to each other in the direction of lamination via a nonmagnetic layer 104, a magnetic gap G' is formed therebetween, and also their widths are formed corresponding to track widths Tw1' and Tw2'. As described above, according to the thin film magnetic head 100 shown in FIG. 22, in which the protrusion 102b is formed on the lower magnetic core layer 102, to have a width corresponding to a width of the protrusion 103a on the upper magnetic core layer 103, a leakage magnetic flux from a side surface in the direction of the track width, i.e., a side fringing can be reduced. By suppressing an adverse effect of this side fringing, a stabilized effective track width can be obtained.

According to the above thin film magnetic head 100, as each component element thereof is formed on the substrate by means of the thin film process, it has become possible to obtain a narrower width track and respond to the demand for a still further improved high density recording on the magnetic recording medium. Accordingly, this thin film magnetic head 100 which has been initially used as a recording/reproducing head for a high density magnetic recording/reproducing apparatus in a magnetic disk drive including a hard disk drive (HDD) is now being used for a magnetic tape drive such as a video tape recorder (VTR) and the like as well.

By the way, in the above magnetic tape drive represented by the VTR or the like, it is common to use a helical scan system. In the magnetic drive using the helical scan system, a magnetic tape runs in a state being helically wound in a predetermined range of angles around an outer periphery of a rotary drum. Further, a pair of recording heads is mounted on this rotary drum with its magnetic gap exposed to outside from the outer periphery thereof. Therefore, in this helical scan system, when the rotary drum is driven to rotate while the magnetic tape runs helically relative to the rotary drum, the pair of recording heads mounted on the rotary drum are enabled to scan helically or obliquely the magnetic tape.

Further, in this magnetic tape drive, whereas one of the pair of the recording heads mounted on the rotary drum applies a magnetic field in response to a recording signal on the magnetic tape so as to form a recording track thereon with a predetermined track width, the other one of the pair of the recording heads applies a magnetic field in response to a recording signal on the magnetic tape so as to form another recording track with a predetermined track width at a position adjacent to the previous recording track formed thereon as described above. Then, by operating the pair of the recording heads to form recording tracks on the magnetic tape in repetition, recording tracks written by the one of the pair of the recording heads and other recording tracks written by the other one of the pair of the recording heads are formed alternately on the magnetic tape.

Further, in this magnetic tape drive, by writing a following recording track to slightly overlap a previously written recording track, a non-recorded region between adjacent recording tracks, i.e., a so-called guard band is eliminated so as to improve the recording density in the magnetic tape.

In addition, in this magnetic tape drive, as the pair of the recording heads are disposed in such a manner that each magnetic gap is slanted relative to a direction orthogonal to a scanning direction of the recording head corresponding to an azimuth angle, and that each azimuth angle is set an opposite phase to each other, an interference between adjacent recording tracks, i.e., a cross talk is suppressed to minimum. This kind of recording method described above is generally referred to as the azimuth recording.

[Patent Document 1]
Japanese Patent Application Publication Laid Open No. 2001-236605 (page 4, FIG. 3) is referred to in the description of the present invention.

By the way, in the magnetic tape drive performing the above-mentioned azimuth recording, when the thin film magnetic head 100 described above is used as its recording head, there is likely to arise a problem of a so-called side erase in which a part of an adjacent recording track is erased.

The side erase is caused mainly by a leakage magnetic flux from a side surface in a direction of the track width described above, i.e., a side fringing, in a non-azimuth recording with no azimuth angle, and if such a side erase occurs in a recording track, there arises a problem that an S/N ratio drops because its reproducing head cannot read out signals sufficiently from the recording track. Further, in a case of the azimuth recording, as the thin film magnetic head 100 which is the pair of the recording head is disposed obliquely corresponding to the azimuth angle, its leakage magnetic flux generated from the side surface in the direction of the track width will have substantially a greater degree of influence as the side fringing in comparison with that in a case of the non-azimuth recording.

Further, in a case of the thin film magnetic head 100 as shown in FIG. 22, even if its side fringing is reduced so that the influence thereof the side fringing becomes negligible, a side erasing may take place owing to the azimuth recording.

More specifically, according to this thin film recording head 100, it is normally arranged such that a recording bit once recorded by a recording magnetic field generated at the protrusion 102b on the side of the lower magnetic core layer 102 which is positioned on a so-called leading side in a scanning direction of the head is re-recorded by a recording magnetic field generated at the protrusion 103a on the side of the upper magnetic core layer 103 which is positioned, opposite the leading side, on a so-called trailing side. Then, in the case of the azimuth recording, as the thin film magnetic head 100 is disposed obliquely corresponding to the azimuth angle as shown in FIG. 23, there occurs a deviation in a direction orthogonal to the scanning direction of the head, namely, in the direction of a track width, between the protrusion 102b on the side of the lower magnetic core layer 102 which is positioned on the leading side and the protrusion 103a on the side of the upper magnetic core layer 103 which is positioned on the trailing side.

In this case, in a recording track formed on the magnetic tape by the thin film magnetic head 100, there arises such a problem that, because of a deviation in the direction of the track width between a recording magnetic field generated by the protrusion 102b on the side of the lower magnetic core layer 102 which is positioned on the leading side and a recording magnetic field generated by the protrusion 103a on the side of the upper magnetic core layer 103 which is positioned on the trailing side, a recording bit is recorded which inevitably includes a phase difference between a track width Tw1' of a recording bit recorded by the recording magnetic field generated at the protrusion 102b on the side of the lower magnetic core layer 102 and a track width Tw2' of a recording bit recorded by the recording magnetic field generated at the protrusion 103b on the side of the upper magnetic core layer 103, thereby reducing an effective track width of this recording bit.

Further, there occurs another problem in this thin film magnetic head 100 that along with the narrowing of the track, its side erase region increases gradually relative to a track pitch, thereby deteriorating its S/N ratio further.

SUMMARY OF THE INVENTION

The present invention is contemplated to solve the aforementioned problems associated with the related art. The present invention provides a thin film magnetic head capable of suppressing the occurrence of side erasing even if the azimuth recording is carried out with respect to a magnetic recording medium.

The present invention also provides a magnetic tape drive which by use of the thin film magnetic head described above as its recording head for carrying out the azimuth recording with respect to a magnetic tape can improve the recording density in the magnetic tape.

A thin film magnetic head is provided according to a preferred embodiment of the present invention, which is an inductive thin film magnetic head in which: at least a bottom magnetic core layer, a nonmagnetic layer and an upper magnetic core layer are laminated on a substrate; each of the lower magnetic core layer and the upper magnetic core layer have a protrusion each formed on an end on a side of a medium facing surface opposing a magnetic recording medium, which protrudes at a predetermined track width corresponding to a recording track to be formed on the magnetic recording medium; the protrusions are disposed adjacent to each other in a direction of lamination via the nonmagnetic layer to form a magnetic gap therebetween; the lower magnetic core layer and the upper magnetic core layer are connected at the other ends thereof in a depth direction remote from the medium facing surface; and a thin film coil is wound around the other ends connected. In the thin film magnetic head, the magnetic gap is disposed on the side of the medium facing surface obliquely to a direction orthogonal to a scanning direction of the head corresponding to an azimuth angle, the upper magnetic core layer is positioned on a leading side in a scanning direction of the head preceding the lower magnetic core layer, the protrusion on the side of the lower magnetic core layer has at least one side surface in the direction of its track width, which is inclined at an angle equal to or larger than its azimuth angle, and one end of top side of the protrusion of the upper magnetic core layer adjacent to the magnetic gap is aligned on a line drawn extending from the inclined side surface of the protrusion on the lower magnetic core layer.

As described hereinabove, in the thin film magnetic head according to the preferred embodiment of the present invention, at least one side surface in the direction of the track width of the protrusion on the lower magnetic core layer has the inclined side surface inclined at an angle equal to or greater than the azimuth angle, and the one end of the top side adjacent to the magnetic gap of the protrusion on the upper magnetic core layer is aligned on the line drawn extending from the inclined side surface of the lower magnetic core layer. Accordingly, it is enabled for a recording magnetic field generated at the protrusion on the lower magnetic core layer on the trailing side sufficiently to re-record a recording bit recorded by a recording magnetic field generated at the protrusion on the upper magnetic core layer positioned on the leading side, in particular, in the direction of the track width, thereby ensuring for the recording bits to be recorded with the phase difference suppressed in the recording track formed on the magnetic recording medium.

A magnetic tape drive according to another preferred embodiment of the present invention includes a tape running means for running a magnetic tape and a recording head for recording signals while making slide contact with the magnetic tape driven by the tape running means. In the magnetic tape drive, the recording head for recording signals on the magnetic tape is an inductive thin film magnetic head. In the magnetic head, at least a bottom magnetic core layer, a nonmagnetic layer and an upper magnetic core layer are laminated on a substrate, each of the lower magnetic core layer and the upper magnetic core layer has a protrusion on an end thereof on a side of a medium slide contact surface opposing the magnetic tape, which protrudes with a predetermined track width corresponding to a recording track to be formed on the magnetic tape; a magnetic gap is formed by positioning these protrusions adjacent to each other in the direction of lamination via the nonmagnetic layer; the lower magnetic core layer and the upper magnetic core layer are connected at the other ends thereof remote from the medium slide contact surface in a depth direction therefrom; and a thin film coil is wound around the connection therebetween. In addition, this thin film magnetic head is characterized in that the magnetic gap is disposed on the side of the medium slide contact surface obliquely relative to a direction orthogonal to a scanning direction of the head corresponding to an azimuth angle, that the upper magnetic core layer is positioned on a leading side preceding the lower magnetic core layer in the scanning direction of the head, that the protrusion on the lower magnetic core layer has at least one inclined side surface in a direction of its track width inclined at an angle equal to or greater than the azimuth angle, and that one end of the top side of the protrusion of the upper magnetic core layer which is adjacent to the magnetic gap is aligned on a line drawn extending from the inclined side surface of the protrusion on the lower magnetic core layer.

As hereinabove described, in a thin film magnetic head for a magnetic tape drive according to the present invention, at least one side surface in the direction of the track width of a protrusion on the lower magnetic core layer has an inclined side surface inclined at an angle equal to or greater than the azimuth angle, and one end of a top side adjacent to the magnetic gap of a protrusion on the upper magnetic core layer is positioned on a line drawn extending from the inclined side surface of the protrusion on the lower magnetic core layer. Therefore, it is enabled that a recording bit recorded by a recording magnetic field generated at the protrusion on the upper magnetic core layer which is positioned on the leading side in the scanning direction of the head is fully re-recorded (overwritten), in particular, in the direction of the track width by a recording magnetic field generated at the protrusion on the lower magnetic core layer which is positioned on the trailing side, thereby enabling for this thin film magnetic head to record a recording bit with its phase difference substantially suppressed in a recording track formed on the magnetic recording medium.

Accordingly, in the magnetic tape drive embodying the present invention, even if the azimuth recording is performed using this thin film magnetic head embodying the invention, it is enabled to suppress the occurrences of both the side erasing due to a difference in the direction of the track width between the recording magnetic field generated at the protrusion on the lower magnetic core layer on the trailing side and the recording magnetic field generated at the protrusion on the upper magnetic core layer on the leading side as well as due to the side fringing, thereby enabling to suppress a reduction in the effective track width of the recording bit.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIGS. 16A and 16B are schematic diagrams showing results of simulation for a recording bit recorded by the thin film magnetic head according to another preferred embodiment of the present invention shown in FIG. 12;

FIGS. 17A and 17B are schematic diagrams showing results of simulation for a recording bit recorded by the thin film magnetic head shown in FIG. 13;

DESCRIPTION OF THE PREFERRED EMBODIMENT

By referring to the accompanying drawings, preferred embodiments of the thin film magnetic head and the magnetic tape drive according to the present invention are described in detail.

Figure 1:
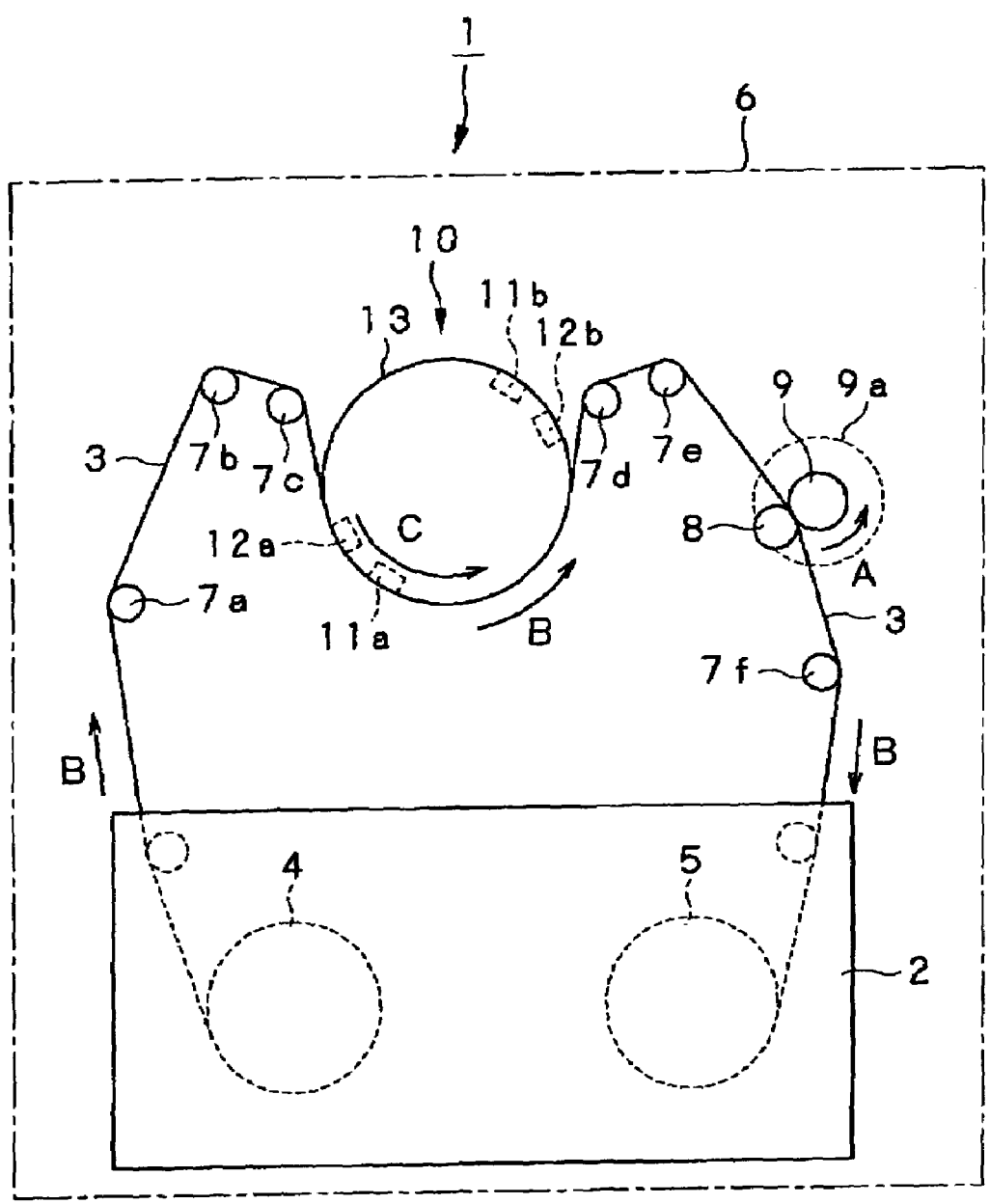
FIG. 1 is a plan view of a schematic diagram showing a magnetic tape drive according to a preferred embodiment of the present invention.

By referring to FIG. 1, a magnetic tape drive 1 according to the present invention records or reproduces information signal on and from a magnetic tape 3 which is a magnetic recording medium and stored in a tape cassette 2, by use of a helical scan system. In the tape cassette 2, there are provided a supply reel 4 rotatable for supplying the magnetic tape 3 and a take-up reel 5 rotatable for winding the magnetic tape 3 supplied from the supply reel 4.

By way of example, the magnetic tape 3 may include not only a so-called coated tape which is manufactured by coating ferromagnetic powders dispersed in a binder on a nonmagnetic substrate, but also a so-called metal evaporated tape which is manufactured by depositing a metal magnetic film which is obliquely oriented on a nonmagnetic substrate.

In this case, the deposition tape has various advantages such as that it is superior in terms of a coercive force, remanent magnetization, gradation and the like, as well as in its electro-magnetic conversion characteristic at short-wavelengths, but also that as a thickness of the magnetic layer thereof can be reduced extremely small in comparison with that of the coated tape, its record demagnetization and a thickness loss at reproducing can be minimized, and that as it is not necessary to combine a binder which is a nonmagnetic material into the magnetic layer, it becomes possible to improve a packing density of the magnetic material so as to obtain a large magnetization. Therefore, by use of this metal evaporated tape described above as the magnetic tape 3 in the tape cassette 2, it has been enabled to improve an electro-magnetic conversion characteristic thereof to obtain a substantially greater output.

The magnetic tape drive 1 has a unit casing 6 which allows loading and unloading the tape cassette 2. The unit casing 6 is provided with a plurality of guide rollers 7a–7f for suspending and running the magnetic tape 3 between the supply reel 4 and the take-up reel 5 when the tape cassette 2 is loaded.

Between the guide rollers 7e and 7f, there is provided tape running means including a pinch roller 8 for suspending the magnetic tape 3, a capstan 9 for trapping the magnetic tape 3 together with the pinch roller 8, and a capstan motor 9a for driving the capstan 9 to rotate. The magnetic tape 3 in a state being trapped between the pinch roller 8 and the capstan 9 is caused to run in a direction indicated by an arrow B in FIG. 1 at a constant speed and tension when the capstan 9 is revolved in a direction indicated by an arrow A by the capstan motor 9a.

Further, between the guide rollers 7c and 7d there is provided a magnetic head drive 10 which is means for recording and reproducing information. This magnetic head drive 10 includes a head drum 13 on which pairs of recording heads 11a, 11b and reproducing heads 12a, 12b are mounted. The magnetic tape 3 pulled out from the tape cassette 2 by the plurality of guide rollers 7a–7f described above is caused to run in the direction of an arrow B in FIG. 1 in a state being helically wound around the head drum 13 in a range of angle approximately of 180 degrees.

Figure 2:
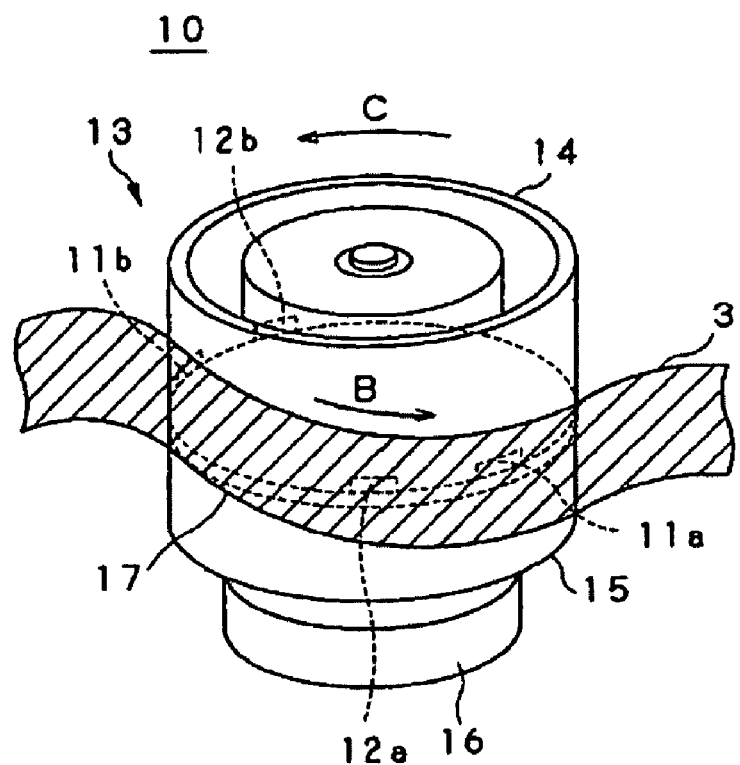
FIG. 2 is a perspective view showing an arrangement of a head drum.

By referring to FIGS. 1 and 2, the head drum 13 which includes a pair of a rotary drum 14 and a stationary drum 15, as well as a drive motor 16 for driving the rotary drum 14 is disposed slightly slanting with respect to a base of the unit casing 6 in a state with each center axes aligned therebetween.

The stationary drum 15 constituting a bottom drum is fixed and supported on the base plate of the unit casing 6. There is formed a lead guide 17 for guiding the magnetic tape 3 around a cylindrical external surface 15a thereof. The magnetic tape 3 is thus caused to run along this lead guide 17 obliquely slanting in the direction of rotation of the rotary drum 14.

On the other hand, the rotary drum 14 constituting an upper drum is supported rotatably on the stationary drum 15, each having an approximately similar diameter with each center axis aligned therebetween, and is driven to rotate in the direction of an arrow C shown in FIGS. 1 and 2 by the drive motor 16 disposed below the stationary drum 15. On an outer peripheral surface of the rotary drum 14 matching that of the stationary drum 15, there are mounted a pair of recording heads 11a, 11b for recording signals on the magnetic tape 3, and a pair of reproducing heads 12a, 12b for reproducing signals from the magnetic tape 3.

Each of the pair of the recording heads 11a, 11b is an inductive type magnetic head comprising a pair of magnetic cores made of a soft magnetic material, laminated via a magnetic gap, and a coil wound around the magnetic cores. The recording heads 11a and 11b are disposed opposite to each other at 180 degrees of a center angle therebetween around the axial center of the rotary drum 14. Further, the recording heads 11a and 11b are disposed slightly protruding from the outer peripheral surface of the rotary drum 14 so that each recording gap is exposed externally therefrom. Further, in order for the recording heads 11a and 11b to be able to perform azimuth recording to the magnetic tape 3, each recording gap thereof is disposed slantingly relative to a direction orthogonal to the running direction of the magnetic tape 3, corresponding to the azimuth angle. Furthermore, it is arranged such that the recording heads 11a and 11b have an azimuth angle of opposite phase from each other.

On the other hand, each of the pair of the reproducing heads 12a and 12b is a magneto-resistive effect type magnetic head (hereinafter referred to as MR head) provided with a magneto-resistive effect element (hereinafter referred to as MR element) as a magnetometric element for sensing signals from the magnetic tape 3. The reproducing heads 12a and 12b are disposed opposite to each other at 180 degrees of a center angle therebetween around the axial center of the rotary drum 14. Further, the reproducing heads 12a and 12b are disposed slightly protruding from the external surface of the rotary drum 14 so that each reproducing gap is exposed externally therefrom. Further, in order for the pair of the reproducing heads 12a and 12b to be able to reproduce an azimuth recorded signal from the magnetic tape 3, each reproducing gap thereof is disposed slantingly relative to the direction approximately orthogonal to the running direction of the magnetic tape 3 corresponding to the azimuth angle. Furthermore, it is arranged such that the pair of the reproducing heads 12a and 12b has an azimuth angle of opposite phase from each other.

In this magnetic head drive 10 which employs the helical scan system, while the magnetic tape 3 partially wound around the head drum 13 runs in the direction of the arrow B in FIG. 2, when the rotary drum 14 is rotated in the direction of the arrow C in FIG. 2, the recording heads 11a, 11b and the reproducing heads 12a, 12b mounted on the rotary drum 14 are operated slantingly to scan the magnetic tape. Accordingly, the recording heads 11a, 11b and the reproducing heads 12a, 12b mounted on the rotary drum 14 perform signal recording or reproducing operations on and from the magnetic tape 3 making slide contact therewith.

More specifically, when recording signals, whereas the one recording head 11a forms a recording track with a predetermined track width by applying a magnetic field corresponding to a recording signal, the other recording head 11b forms a recording track with a predetermined track width, adjacent to the recording track formed by the recording head 11a, by applying a magnetic field corresponding to a recording signal. Through operation of these recording heads 11a, 11b to form recording tracks repeatedly onto the magnetic tape 3, continuous signal recording to the magnetic tape 3 can be performed. Accordingly, on this magnetic tape 3, both recording tracks written by each of the pair of the recording heads are formed alternately.

Further, when recording signals, it has been practiced to minimize a non-recorded region between adjacent recording tracks, i.e., a so-called guard band and thus improve a recording density in the magnetic tape 3 by arranging such that a subsequent recording track is formed slightly to overlap a preceding recording track. Still further, the recording heads 11a and 11b are disposed so that each recording gap is slanted to the direction orthogonal to the scan direction of the head depending on the azimuth angle, and the azimuth angle is set to be an opposite phase to each other so as to minimize interference or cross-talk between adjacent recording tracks.

On the other hand, when reproducing signals, whereas one reproducing head 12a detects a magnetic field of signal from a recording track recorded by the one recording head 11a, the other reproducing head 12b detects a magnetic field of signal from another recording track adjacent thereto recorded by the other recording head 11b. By operating these reproducing heads 12a and 12b repeatedly to detect magnetic fields of signals from the recording tracks, the signals recorded on the magnetic tape 3 are continuously reproduced.

Figure 3:
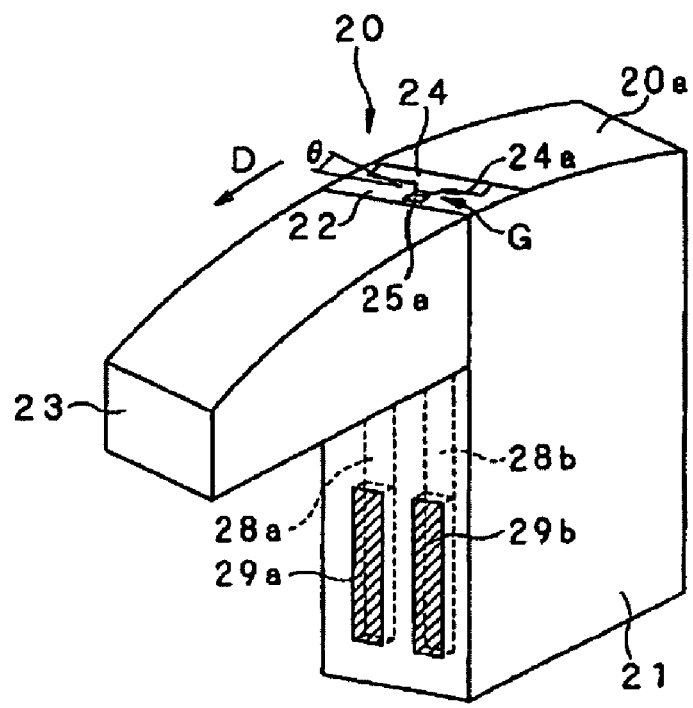
FIG. 3 is a perspective view showing a construction of a thin film magnetic head according to a preferred embodiment of the present invention.
Figure 4:
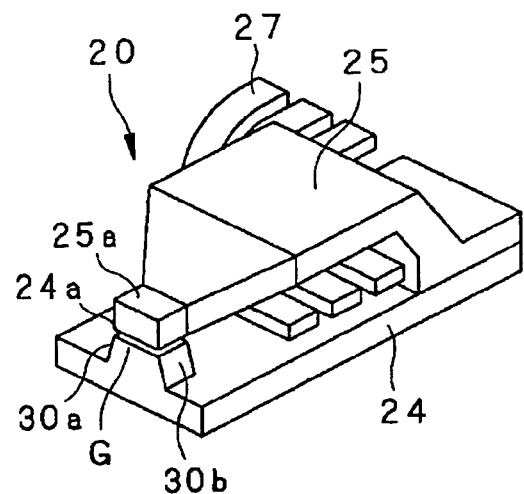
FIG. 4 is a perspective view showing a main part of construction of the above thin film magnetic head.

By the way, the inductive thin film magnetic head 20 according to the preferred embodiment of the present invention shown in FIGS. 3 and 4 is used for the pair of the recording heads 11a, 11b described above.

In this thin film magnetic head 20, because each component elements thereof such as magnetic cores, coils and the like are formed on the substrate using a thin film process such as plating, sputtering, ion-milling or the like, it can cope with a demand for a still narrower track width and a higher recording density of recording in a magnetic recording medium.

More specifically, each of the pair of the recording heads 11a, 11b has a structure that is provided by forming the thin film magnetic head 20 on a first head material member 21 made of a nonmagnetic material, and bonding a second head material member 23 made of a nonmagnetic material on the thin film magnetic head 20 via a protection film 22.

It is noted that this thin film magnetic head 20 is fabricated by the steps of forming a plurality of head elements having a similar shape on a first substrate which becomes the first head material member 21; bonding a second substrate which becomes the second head material member 23 on the plurality of head elements formed on the first head material so as to form a plurality of head blocks; and slicing the plurality of head blocks into each head chips.

Further, in order to ensure a smooth contact with the magnetic tape 3, this thin film magnetic head 20 is provided with a medium sliding contact surface 20a for making a sliding contact with the magnetic tape 3, which is fabricated to have a curved surface like a circular arc curved along the scanning direction of the head as shown by an arrow D in FIG. 3. Then, the thin film magnetic head 20 is disposed so that a recording gap G thereof exposed to the outside from the medium sliding contact surface 20a is slanted relative to a direction approximately orthogonal to the scanning direction of the magnetic tape 3 corresponding to the azimuth angle $\theta$.

It is noted that each of the pair of the recording heads 11a, 11b has a similar structure except that each azimuth angle is set in an opposite phase to each other. Therefore, in the following description, these pair of the recording heads 11a, 11b will be described together as the thin film magnetic head 20.

Figure 5:
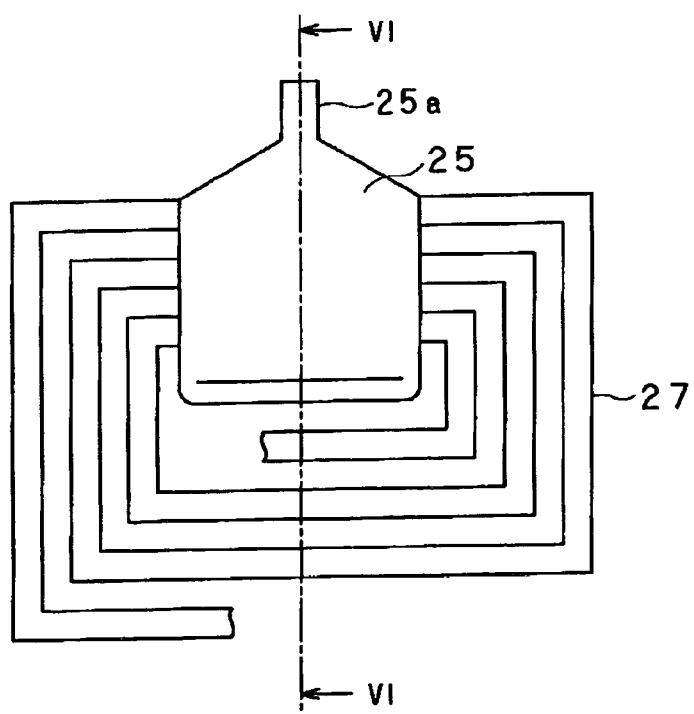
FIG. 5 is a plan view showing the construction of the above thin film magnetic head.
Figure 6:
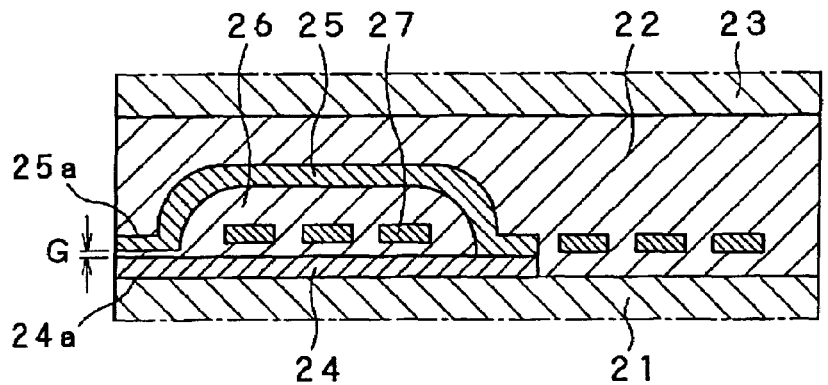
FIG. 6 is a cross-sectional cut out view along line VI—VI of the above thin film magnetic head.
Figure 7:
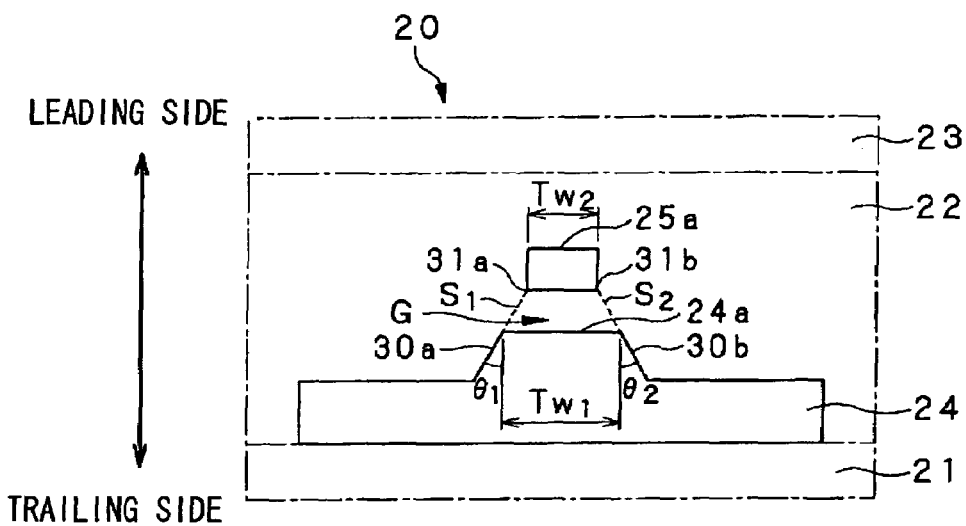
FIG. 7 is a side view of the above thin film magnetic head, as observed from a medium facing surface.

With reference to FIGS. 5, 6 and 7, this thin film magnetic head 20 comprises a lower magnetic core layer 24 and an upper magnetic core layer 25 forming a magnetic circuit in combination, which are laminated on a first head material 21. The lower magnetic core layer 24 and the upper magnetic core layer 25 have a protrusion 24a and a protrusion 25a, respectively, matching each other on each end thereof on the side of a medium facing surface opposing the magnetic tape 3, i.e., on the side of the medium sliding contact surface 20, protruding with each predetermined track width Tw1, Tw2 corresponding to each recording track to be formed on the magnetic tape 3. These protrusions 24a and 25a are positioned adjacent to each other in the direction of lamination via a nonmagnetic layer 26 to form the magnetic gap G therebetween.

In the thin film magnetic head 20 as described above, it has become possible to narrow a recording magnetic field from the magnetic gap G by forming the protrusion 24a on the lower magnetic core layer 24 matching the protrusion 25a of the upper magnetic core layer 25, thereby enabling to record very small recording bits in a recording track on the magnetic tape 3.

Further, a back gap is formed by connecting the lower magnetic core layer 24 and the upper magnetic core layer 25 at the other ends thereof remote from the medium sliding contact surface 20a in a depth direction therefrom. Between the lower magnetic core layer 24 and the upper magnetic core layer 25 there is provided a thin film coil 27 wound around this back gap in a state of being embedded in the nonmagnetic layer 26.

Further, an internal end and an external end of the thin film coil 27 are extended to the opposite side from the medium sliding contact surface 20a to be connected to lead wires 28a, 28b as shown in FIG. 3. These lead wires 28a, 28b are connected to external connection terminals 29a, 29b for connection with an external circuit which supplies a current to the thin film coil 27 corresponding to the recording signal.

Further, the uppermost surface of this thin film magnetic head 20 is covered with the above-mentioned protection film 22 except a portion exposing the external connection terminals 29a, 29b to the outside.

In order to perform the azimuth recording described above, this thin film magnetic head 20 is disposed so that the magnetic gap G thereof is slanted to the direction orthogonal to the scanning direction of the head, which is indicated by the arrow D in FIG. 3, corresponding to the azimuth angle θ.

Further, this thin film magnetic head 20 is disposed such that the upper magnetic core layer 25 is positioned preceding the lower magnetic core layer 24 in the scanning direction of the head. Namely, in this thin film magnetic head 20, the protrusion 25a on the side of the upper magnetic core layer 25 is positioned on a so-called leading side in the scanning direction of the head, and the protrusion 24a on the side of the lower magnetic core layer 24 is positioned on a so-called trailing side opposite the leading side.

Still further, in this thin film magnetic head 20, both side surfaces of the protrusion 24a in the direction of the track width on the lower magnetic core layer 24 on the side of the medium sliding contact surface 20a are fabricated to have inclined side surfaces 30a, 30b, inclined at angles θ1, θ2 which are equal to or greater than the azimuth angle, and both ends 31a, 31b of a top side adjacent to the magnetic gap G of the protrusion 25a of the upper magnetic core layer 25 are positioned respectively on lines S1, S2 drawn extending from the above-mentioned inclined side surfaces 30a, 30b of the lower magnetic core layer 24.

In this case, a track width Tw2 on a top side adjacent to the magnetic gap G of the protrusion 25a on the upper magnetic core layer 25 which is on the leading side is smaller than a track width Tw1 on a top side adjacent to the magnetic gap G of the protrusion 24a on the lower magnetic core layer 24 which is on the trailing side. In addition, even if the magnetic gap G is disposed slantingly corresponding to the azimuth angle θ, the track width Tw2 of the upper magnetic core layer 25 which is on the leading side is caused to reside inside the track width Tw1 of the lower magnetic core layer 24 which is on the trailing side.

In the thin film head 20 fabricated as described above, when a current corresponding to a recording signal is supplied from the external circuit to the thin film coil 27, a magnetic flux is generated passing through the lower magnetic core layer 24 and the upper magnetic core layer 25, and simultaneously, a recording magnetic field is produced in the magnetic gap G. By applying this recording magnetic field to the magnetic tape 3, a recording track on which recording bits are recorded is formed corresponding to the recording signal.

Here, in a case where the azimuth recording is performed using the thin film magnetic head 20 described above, as shown in FIG. 8, a recording bit recorded by the recording magnetic field generated at the protrusion 25a on the upper magnetic core layer 25 which is on the leading side in the scanning direction of the head is re-recorded or overwritten by the recording magnetic field generated at the protrusion 24a on the lower magnetic core layer 24 which is on the trailing side.

In this case, because that one end 31b of a top side adjacent to the magnetic gap G of the protrusion 25a on the upper magnetic core layer 25 which is on the leading side is aligned on a line S2 extending from the inclined side surface 30b of the protrusion 24a on the lower magnetic core layer 24 which is on the trailing side, it is enabled to record a recording bit in a recording track to be formed on the magnetic tape 3, which has suppressed a phase difference between a track width Tw1 of the recording bit recorded by the recording magnetic field generated at the protrusion 24a on the lower magnetic core layer 24 positioned on the trailing side and a track width Tw2 of the recording bit recorded by the recording magnetic field generated at the protrusion 25a on the upper magnetic core layer 25 positioned on the leading side.

Therefore, even if the azimuth recording to the magnetic tape 3 is performed by use of this thin film magnetic head 20, it is enabled to suppress the occurrence of the side erase, and prevent narrowing of an effective track width of the recording bit formed by this thin film magnetic head 20.

Figure 9:
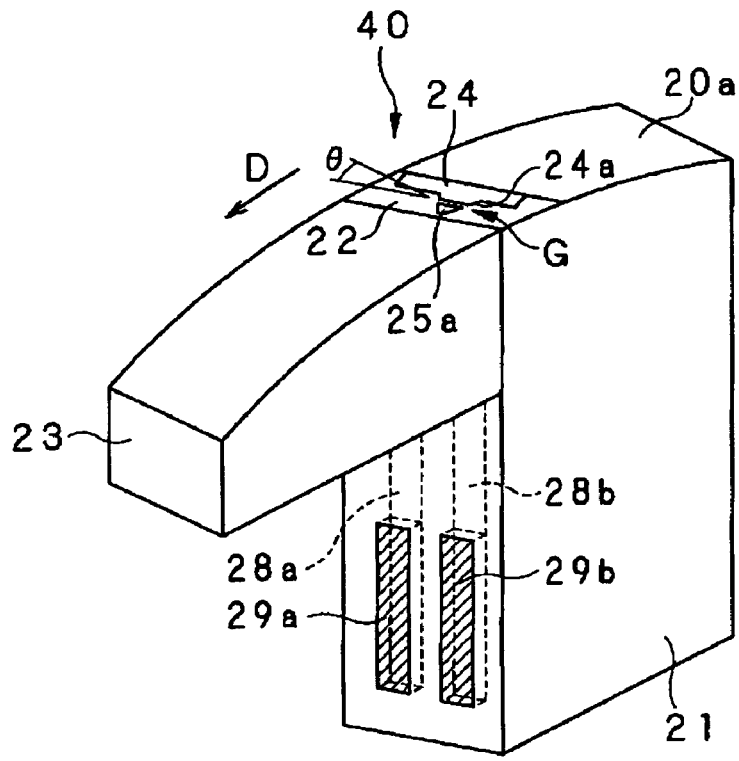
FIG. 9 is a perspective view indicating a construction of a thin film magnetic head according to another preferred embodiment of the present invention.
Figure 10:
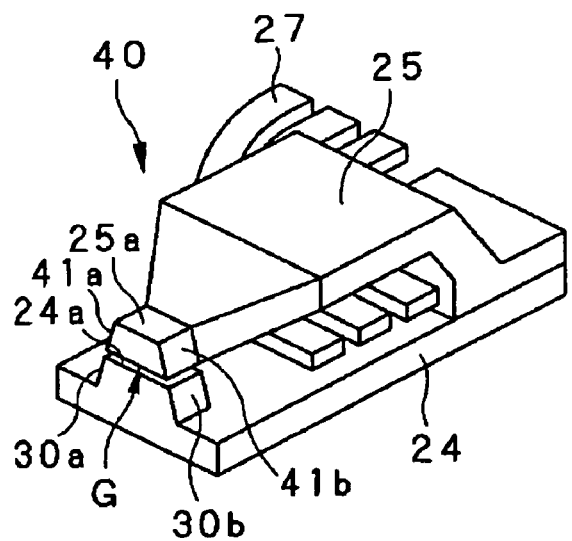
FIG. 10 is a perspective view showing a main part of a construction of the thin film magnetic head of another embodiment.
Figure 11:
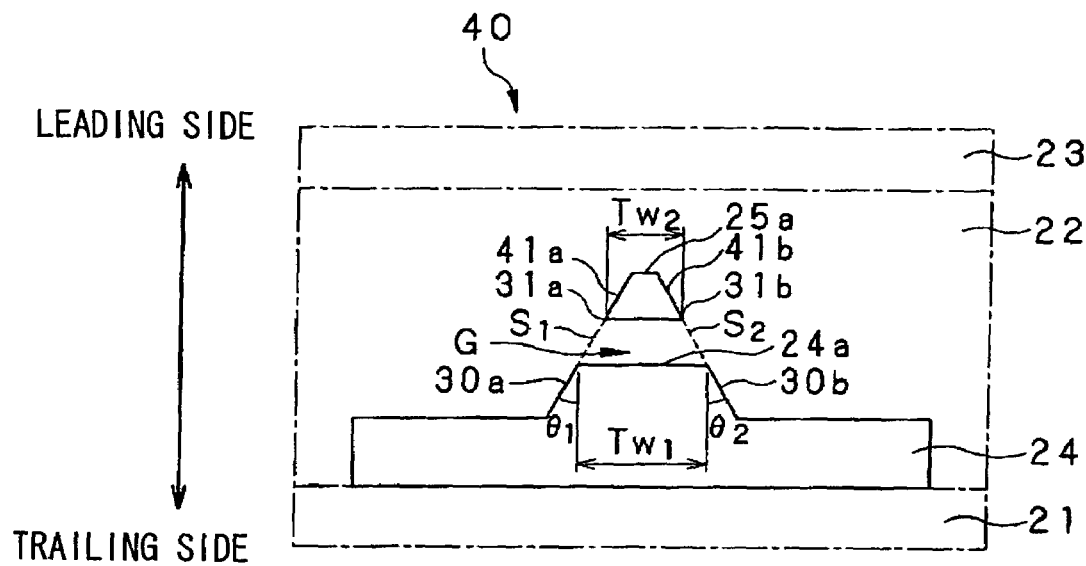
FIG. 11 is a side view showing the construction of the thin film magnetic head of another embodiment as observed from the medium facing surface.

Now, with reference to FIGS. 9, 10 and 11, a thin film magnetic head 40 according to another preferred embodiment of the invention will be described. In this thin film magnetic head 40, parts equivalent to or similar to those as in the above thin film magnetic head 20 will be omitted of its description, and labeled with the same reference numerals in the accompanying drawings.

This thin film magnetic head 40 of the another preferred embodiment of the present invention has a construction similar to that of the thin film magnetic head 20 described above except that both side surfaces of the protrusion 25a on the upper magnetic core layer 25 on the leading side which are aligned on lines S1, S2 extending from inclined side surfaces 30a, 30b of the protrusion 24a on the lower magnetic core layer 24 on the trailing side are fabricated to have inclined side surfaces 41a, 41b slanting at angles θ1, θ2, equal to or greater than the azimuth angle.

Also, in this case, a track width Tw2 of a top side adjacent to the magnetic gap G of the protrusion 25a on the upper magnetic core layer 25 on the leading side becomes smaller than a track width Tw1 of a top side adjacent to the magnetic gap G of the protrusion 24a on the lower magnetic core layer 24 on the trailing side. In addition, even if the magnetic gap G is disposed slantingly corresponding to the azimuth angle θ, the track width Tw2 on the side of the upper magnetic core layer 25 positioned on the leading side will be contained inside the track width Tw1 on the side of the lower magnetic core layer 24 positioned on the trailing side.

Figure 12:
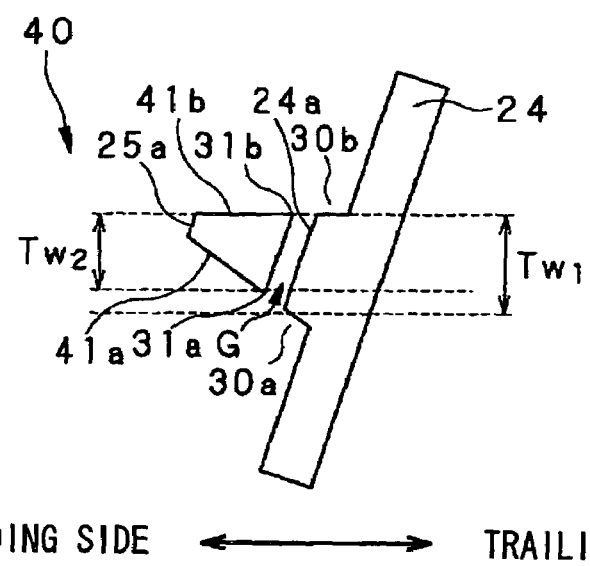
FIG. 12 is a schematic diagram showing a scanning condition in an azimuth recording of the thin film magnetic head of another embodiment.

When the azimuth recording is carried out using this thin film magnetic head 40 according to another preferred embodiment of the present invention, as shown in FIG. 12, the inclined side surface 41b of the protrusion 25a on the upper magnetic core layer 25 positioned on the leading side is aligned on a line S2 drawn extending from the inclined side surface 30b of the protrusion 24a on the lower magnetic core layer 24 positioned on the trailing side. Therefore, it is enabled to record such a recording bit in a recording track to be formed on the magnetic tape 3 that has suppressed a phase difference between the track width Tw1 of a recording bit recorded by the recording magnetic field generated at the protrusion 24a on the lower magnetic core layer 24 on the trailing side and the track width Tw2 of a recording bit recorded by the recording magnetic field generated at the protrusion 25a on the upper magnetic core layer 25. Further, in this case, a side fringing generated from both sides: an upper side along which inclined side surfaces 30b and 41b are aligned; and a lower side along which inclined side surfaces 30a and 41a are aligned, can be reduced even smaller than in the case of the thin film magnetic head 20 described above. As a result, the thin film magnetic head 40 suppresses the side erase substantially further more than in the thin film magnetic head 20 described above.

Therefore, by use of this thin film magnetic head 40, when the azimuth recording is performed to the magnetic tape 3, not only the side erase resulting from the deviation of magnetic cores in the direction of the track widths by the azimuth recording can be suppressed, but also the occurrence of the side erase due to the side fringing can be suppressed, thereby preventing the effective track width of recording bits formed by the thin film magnetic head 40 from being reduced.

By the way, as a related invention concerning an HDD, a thin film magnetic head has been proposed (refer to the patent document No. 1), in which a lower magnetic core layer is positioned on the leading side preceding the upper magnetic core layer in the scanning direction of the head, and where at least one side surface in the direction of the track width of the protrusions on the lower magnetic core layer and the upper magnetic core layer has an inclined side surface inclined at an angle greater than a maximum angle of the skew angle.

In a magnetic disk drive represented by the HDD as described above, although it is basically a non-azimuth recording type, because its magnetic head which is operated in a radius direction of a magnetic disk is likely to have a skew angle which is variable to a certain degree with respect to the magnetic disk, the magnetic head mounted on a floating head slider which is floating on the magnetic disk will slant its magnetic gap corresponding to the skew angle in the scanning direction of the head, i.e., in the direction of rotation of the disk, likewise in the case of the azimuth recording method described above. As a result, causing a problem of rewriting or erasing of data in an adjacent recording track to occur. The thin film magnetic head disclosed in the patent document 1 is proposed as means for solving the above problem similar to that in the azimuth recording.

However, in this case, because the thin film magnetic head is formed on the substrate which becomes the floating head slider, owing to the floating posture of the floating head slider, the protrusion on its lower magnetic core layer is positioned on the leading side in the scanning direction of the head, and the protrusion on its upper magnetic core layer is positioned on the trailing side.

Figure 13:
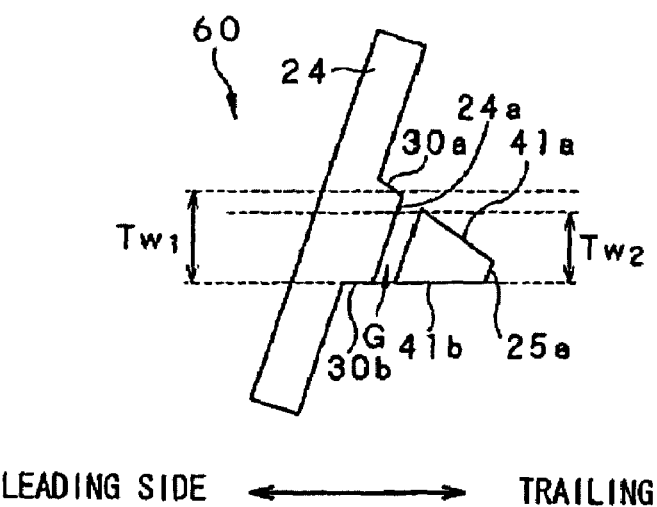
FIG. 13 is a schematic diagram showing an inversed arrangement of the scanning condition in azimuth recording for the thin film magnetic head of another embodiment.

Therefore, in the thin film magnetic head disclosed in the patent document 1, likewise a thin film magnetic head 60 as shown in FIG. 13, it has a reversed arrangement of the thin film magnetic head 40 described above with reference to FIG. 12, so that protrusion 24a on the lower magnetic core layer 24 is positioned on the leading side whereas protrusion 25a on the upper magnetic core layer 25 is positioned on the trailing side. In the case of this reversed arrangement, recording bits recorded by a recording magnetic field generated at the protrusion 24a on the lower magnetic core layer 24 on the leading side in the scanning direction of the head will be re-recorded by a recording magnetic field generated at the protrusion 25a on the upper magnetic core layer 25 on the tailing side.

In this case, although such advantages may be expected that adverse magnetic effects of overwriting or erasing data in an adjacent recording track are suppressed to some degrees, because of a fact that a track width Tw2 of the top side adjacent to the magnetic gap G of the protrusion 25a on the upper magnetic core layer 25 which is positioned on the trailing side is smaller than a track width Tw1 of the top side adjacent to the magnetic gap G of the protrusion 24a on the lower magnetic core 24 which is positioned on the leading side, there occurs a problem that a recording bit including a phase difference therein is recorded in its own recording track, thereby reducing an effective track width of the recording bits.

Figure 8:
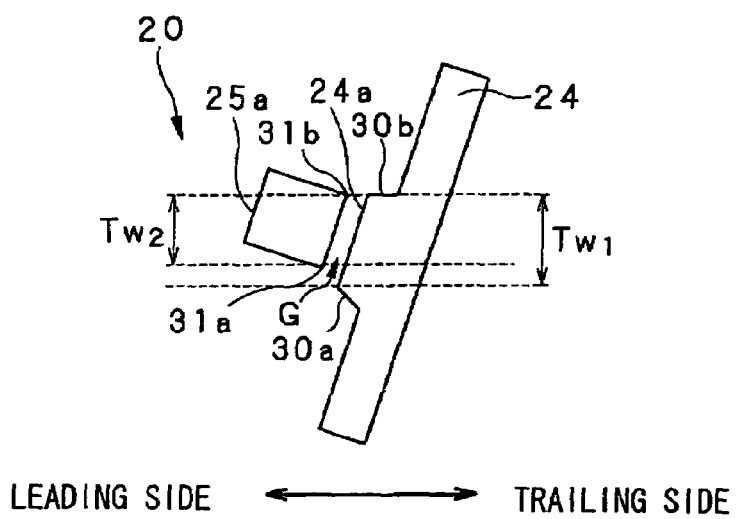
FIG. 8 is a schematic diagram indicating a scanning condition in an azimuth recording of the above thin film magnetic head.
Figure 23:
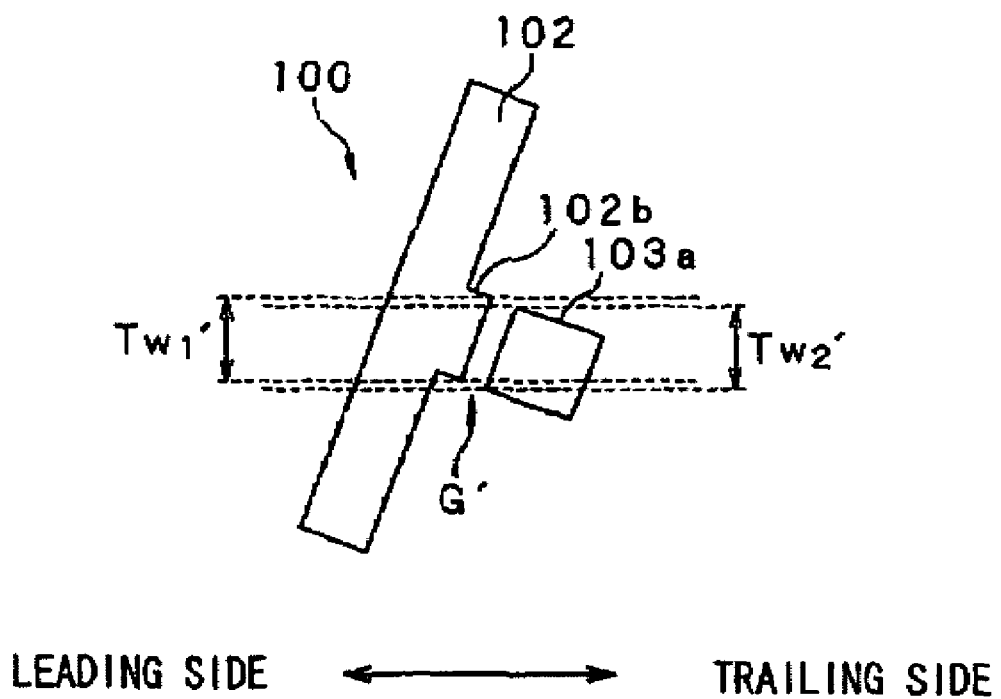
FIG. 23 is a schematic diagram showing a scanning condition in azimuth recording of the above conventional thin film magnetic head.

Computer simulations are executed for the thin film magnetic head 20 according to the preferred embodiment of the present invention shown in FIG. 8, the thin film magnetic head 40 according to another preferred embodiment of the present invention shown in FIG. 12, and the thin film magnetic head 60 shown in FIG. 13 as well as the conventional thin film magnetic head 100 shown in FIG. 23 to simulate each pattern of recording bits (di-bit pattern) recorded on a recording medium using each head described above. As a recording medium, the metal evaporated tape described above is used. Of the three recording bits sequentially recorded by scanning each head on a magnetic tape which was kept still, a boundary of a recording bit in the center resulting from a magnetization reversal is sampled and subjected to computer simulation.

In this computer simulation, conditions of computation are set as follows: an azimuth angle at 20 degrees; a track width of the upper magnetic core layer at 1.8 $\mu$m; a magnetic gap length at 0.25 $\mu$m; each length of the three recording bits at 1.0 $\mu$m; and a magnetic spacing between the medium sliding contact surface and the magnetic tape at 30 nm.

Figure 14A:
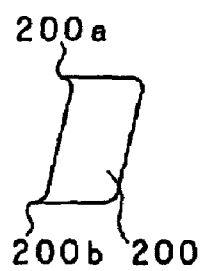
FIGS. 14A and 14B are schematic diagrams showing results of simulation for a recording bit recorded by a conventional thin film magnetic head as shown in FIG. 23.

As shown in FIG. 14A, in any one recording bit 200 recorded by the conventional thin film magnetic head 100 shown in FIG. 23, a pair of recording patterns 200a, 200b from both edges in the direction of its track width of the recording bit extending toward the scanning direction of the head (toward the leading side) are formed due to a phase difference in the direction of the track width in the recording bit due to a deviation in the direction of the track width between the recording magnetic field generated at the protrusion 102b on the lower magnetic core layer 102 on the leading side and the recording magnetic field generated at the protrusion 103a on the upper magnetic core layer 103 on the trailing side.

Figure 14B:
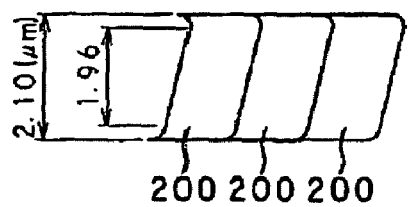

As shown in FIG. 14B, when a plurality of such recording bits 200 are recorded on a recording track on the magnetic tape, a pair of the recording patterns 200a, 200b of a preceding recording bit 200 recorded previously extends to track edges of a subsequent recording bit 200 so as to cause the side erase therein to occur, thereby partially reducing an effective track width of the recording bits 200 in the vicinity of its magnetization transfer region. More specifically, as a result of the simulation, in comparison with a total width of the recording bit 200 being 2.10 µm, the effective track width thereof is partially narrowed, in particular, in the vicinity of the magnetization transition region, and in the worst case, it is narrowed to 1.96 µm.

Figure 15A:
FIGS. 15A and 15B are schematic diagrams showing results of simulation for a recording bit recorded by the thin film magnetic head according to the preferred embodiment of the present invention shown in FIG. 8.

In contrast to the above, as shown in FIG. 15A, in the thin film magnetic head 20 according to the preferred embodiment of the present invention, because that the one end 31b of the top side adjacent to the magnetic gap G of the protrusion 25a on the upper magnetic core layer 25 on the leading side is positioned on the line S2 drawn extending from the inclined side surface 30b of the protrusion 24a on the lower magnetic core layer 24 on the trailing side, the track width Tw2 of a recording bit recorded on the recording track formed on the magnetic tape 3 by the recording magnetic field generated at the protrusion 25a on the upper magnetic core layer 25 on the leading side is ensured to be contained within the track width Tw1 of a recording bit recorded thereon by the recording magnetic field generated at the protrusion 24a on the lower magnetic core layer 24 positioned on the trailing side. Accordingly, in comparison with the recording bits 200 which are recorded by the conventional thin film magnetic head 100 and revealed the problem of inclusion of a large phase difference in the computer simulation, a preferable recording bit 70 can be recorded with the phase difference suppressed therein advantageously.

Figure 15B:
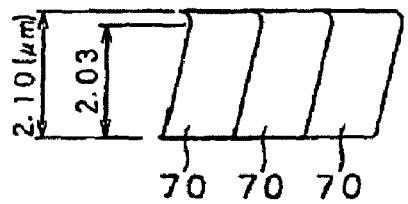

Therefore, according to this thin film magnetic head 20, as shown in FIG. 15B, even if the azimuth recording is performed to the magnetic tape 3, the occurrence of the side erase can be suppressed, thereby suppressing reducing the effective track width in the recording bit 70 to be formed by the thin film magnetic head 20. More specifically, as a result of the simulation, whereas a total width of the recording bit 70 is 2.10 µm, an effective track width thereof is ensured to be contained within 2.03 µm at worst.

The reason why the total widths of the recording bit 200 and the recording bit 70 are widened to 2.10 µm is considered to be due to that the influence of the side fringing from the thin film magnetic heads 100, 20 was substantially large. Therefore, in the thin film magnetic head 20 shown in FIG. 8, within a range of a magneto-motive force or a magnetic spacing in which the influence of the side fringing is not large, the recording bit 70 is recorded with the phase difference therein suppressed accordingly, thereby enabling to suppress reducing of the effective track width in the recording bit 70.

As shown in FIG. 16A, on the other hand, in the thin film magnetic head 40 according to the preferred embodiment of the invention shown in FIG. 12, because that the inclined side surface 41b of the protrusion 25a on the upper magnetic core layer 25 on the leading side is positioned on the line S2 extending from the inclined side surface 30b of the protrusion 24a on the lower magnetic core layer 24 positioned on the trailing side, the track width Tw2 of the recording bit recorded on the recording track formed on the magnetic tape 3 by the recording magnetic field generated at the protrusion 25a on the upper magnetic core layer 25 on the leading side can be contained inside the track width Tw1 of the recording bit recorded by the recording magnetic field generated at the protrusion 24a on the lower magnetic core layer 24 on the trailing side, thereby enabling to record a recording bit 80 in which the phase difference is substantially suppressed. In addition, in this case, as it is enabled to reduce side fringing generated from both sides of the upper side line along which the inclined side surfaces 30b and 41b are formed and the lower side line along which the inclined side surfaces 30a and 41a are formed, the occurrence of the side erasing as observed in the thin film magnetic heads 100 and 20 due to the side fringing described above can be also suppressed.

Therefore, as shown in FIG. 16B, in this thin film magnetic head 40, even if the azimuth recording to the magnetic tape 3 is conducted, the occurrence of the side erasing due to the positional deviation of the magnetic core in the direction of the track width in the azimuth recording as well as the occurrence of the side erasing due to the side fringing can be suppressed simultaneously, thereby suppressing the narrowing of the effective track width in the recording bit 80 formed by use of this thin film magnetic head 40. More specifically, as a result of the simulation, it is noted that whereas a total width of the recording bit 80 was 2.03 µm, its effective track width also became 2.03 µm, thereby proving that any decrease in the track width due to the phase difference in the recording bit described above did not occur. Further, in contrast to the total widths of the recording bits 200 and 70 being 2.10 µm as described above, the total width of the recording bit 80 was narrowed to 2.03 µm, thereby proving the suppression of the influence of the side fringing.

As shown in FIG. 17A, in contrast to the above, in any one recording bit 90 recorded by the above thin film magnetic head 60 shown in FIG. 13 described above, when a recording bit once recorded by the recording magnetic field generated at the protrusion 24a on the bottom magnetic core layer 24 positioned on the leading side is re-recorded (overwritten) by the recording magnetic field generated at the protrusion 25a on the upper magnetic core layer 25 positioned on the trailing side, because of the presence of a phase difference in the recording bit due to an insufficient overwriting in the direction of the track width, a pair of recording patterns 90a, 90b extending from both side edges of the recording bit in the direction of the track width thereof toward the scanning direction of the head (toward the leading side) are formed.

Then, as shown in FIG. 17B, when a plurality of such recording bits 90 are recorded on a recording track on the magnetic tape 3, likewise the recording bits 200 shown in FIG. 14B described above, as the pair of the recording patterns 90a, 90b existing on both sides of the recording bit 90 recorded previously extend to the track edges of a subsequent recording bit 90 to cause a side erasing thereof, an effective track width of the recording bits 90 will be reduced in the vicinity of its magnetization transition region. More specifically, as a result of its computer simulation, whereas a total width of the recording bit 90 is 2.17 µm, the effective track width thereof was partially reduced to 1.96 µm in the vicinity of the magnetization transfer region in the worst case, demonstrating the worst result among the four types of the thin film magnetic heads having a different core structure and subjected to the computer simulation.

It is noted that the reason why the total width of the recording bit 90 became larger than those of the other types of heads is considered owing to that the track width Tw1 of its side adjacent to the magnetic gap G of the protrusion 24a on the lower magnetic core layer 24 positioned on the leading side is larger than the track width Tw2 of its side adjacent to the magnetic gap G of the protrusion 25a on the upper magnetic core layer 25 positioned on the trailing side, and, in combination with the above, that a recording magnetic field generated at the protrusion 24a on the lower magnetic core layer 24 positioned on the leading side can reverse the magnetization in the magnetic layer of the vapor deposition tape even at a slightly smaller recording magnetic field strength in comparison with a recording magnetic field generated at the protrusion 25a on the upper magnetic core layer 25 positioned on the trailing side.

Figure 18:
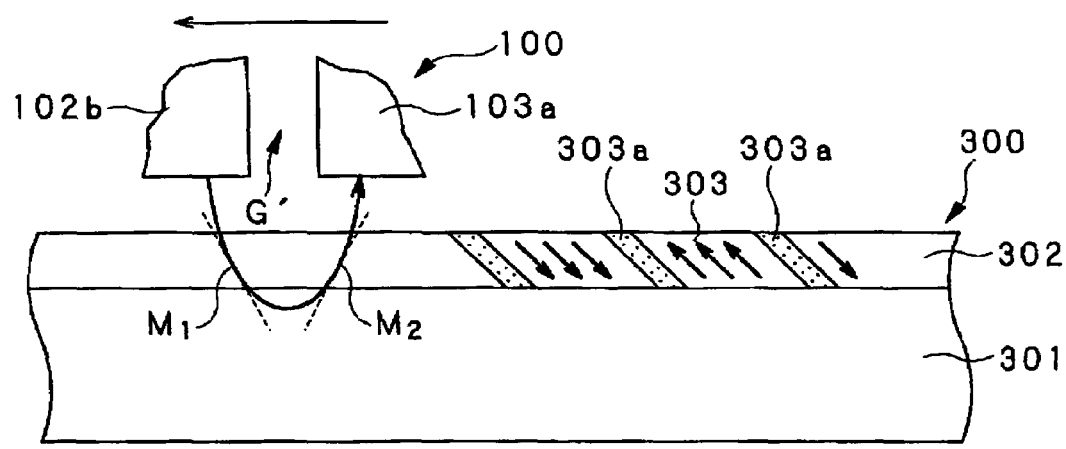
FIG. 18 is a schematic diagram illustrating a recording method for recording to a metal evaporated tape.
Figure 19:
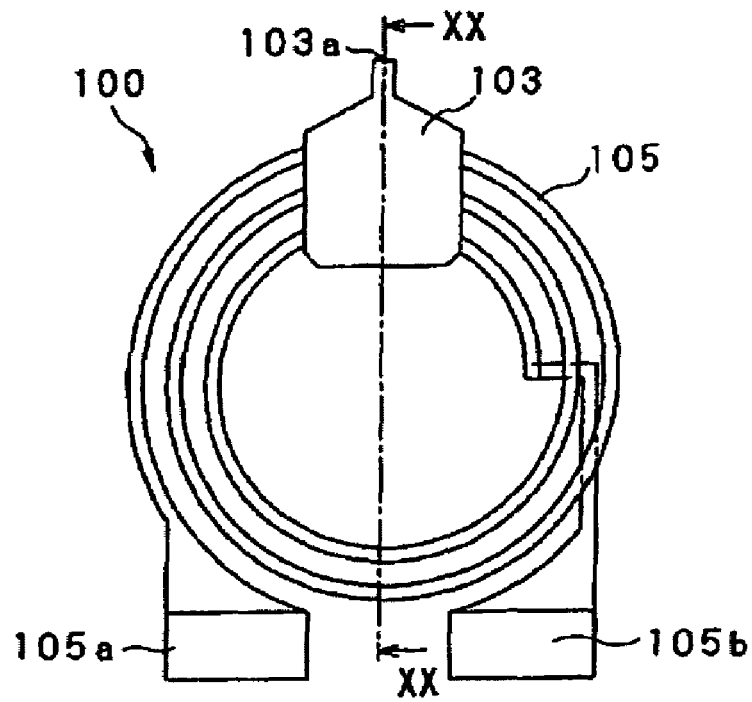
FIG. 19 is a plan view showing an exemplary construction of a conventional thin film head.
Figure 20:
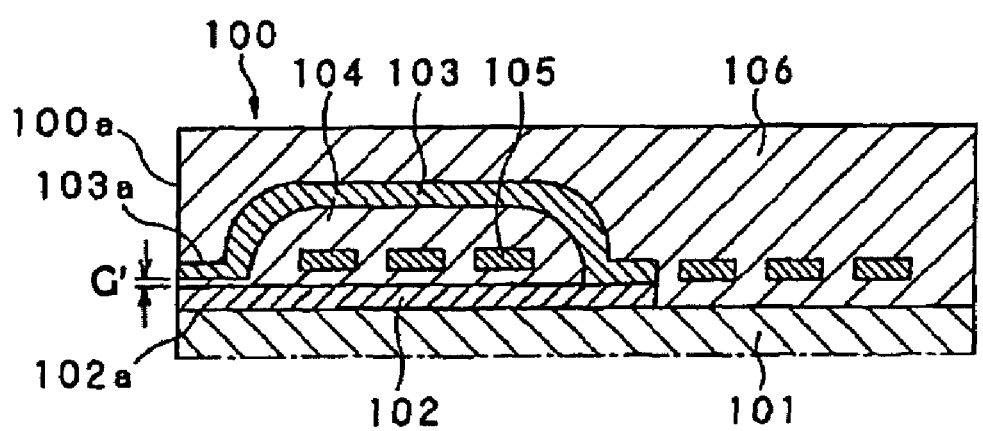
FIG. 20 is a cross-sectional view cut out along line XX—XX showing the construction of the above conventional thin film magnetic head.
Figure 21:
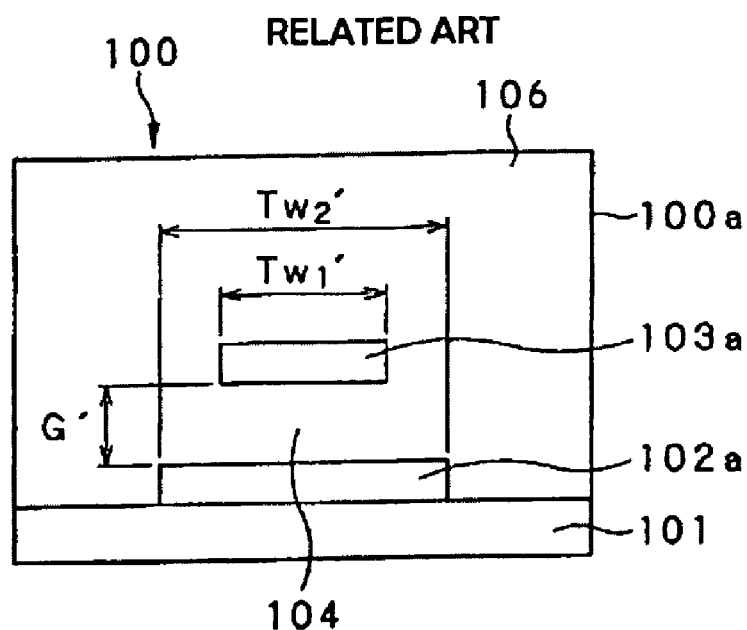
FIG. 21 is a side view of the above conventional thin film magnetic head as seen from its medium facing surface.
Figure 22:
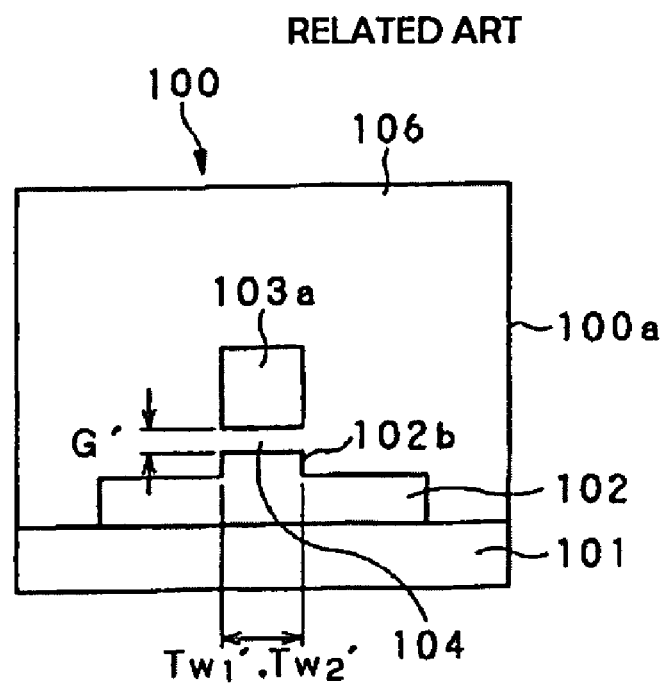
FIG. 22 is a side view showing another arrangement of the above conventional thin film head as seen from its medium facing surface.

With reference to FIG. 18, a method of recording information to a metal evaporated tape 300 will be described by way of example of using the thin film recording head 100 described above. In FIG. 18, there is shown only a portion in the vicinity of the medium sliding contact surface where a protrusion 103a on the side of an upper magnetic core layer 103 and a protrusion 102b on the side of a lower magnetic core layer 102 are disposed opposite to each other via a gap G' of the thin film recording head 100.

The metal evaporated tape 300 described above is prepared by obliquely depositing a metal magnetic film 302 on a nonmagnetic base material 301. The most remarkable feature of this metal evaporated tape 300 for recording/reproducing signals resides in that its axis of easy magnetization is slanted relative to a normal line in a cross-section of the film including a longitudinal direction of the tape. Further, arrows indicated in FIG. 18 show each direction of magnetization inside the metal magnetic film 302 of the metal evaporated tape 300.

On the other hand, in the thin film magnetic head 100, whereas a recording magnetic field M1 generated at the protrusion 102b on the lower magnetic core layer 102 positioned on the leading side is slanted to a similar side (or direction) as an easy axis of magnetization of the metal evaporated tape 300, a recording magnetic field M2 generated at the protrusion 103a on the upper magnetic core layer 103 positioned on the trailing side is slanted oppositely to the easy axis of magnetization in the metal evaporated 300, namely, it is slanted to a similar side (direction) as a hard axis of magnetization.

By the way, contrary to the arrangement of FIG. 18, it may be arranged such that the easy axis of magnetization in the metal evaporated tape 300 relative to the thin film magnetic head 100 is slanted to the same direction as the recording magnetic field M2 generated at the protrusion 103a on the upper magnetic core layer 103 positioned on the trailing side. However, according to the arrangement of FIG. 18 in which the easy axis of magnetization in the metal evaporated tape 300 is slanted to the same direction as the recording magnetic field M1 generated at the protrusion 102b on the lower magnetic core layer 102 positioned on the leading side, as a rate of decrease of components in the direction of the easy axis of magnetization becomes steep for the recording magnetic field M2 generated at the protrusion 103a on the upper magnetic core layer 103 positioned on the trailing side, advantageously, an effect of further narrowing of a magnetization transfer region 303a in a recording bit 303 recorded on the tape 300 can be obtained, the arrangement as shown in FIG. 18 is usually adopted.

Accordingly, in the case of the arrangement as shown in FIG. 18, as the recording magnetic field M1 generated at the protrusion 102b on the lower magnetic core layer 102 positioned on the leading side is slanted to the same side (direction) as the easy axis of magnetization in the metal evaporated tape 300, it is possible to reverse the magnetization in the metal magnetic film 302 of the metal evaporated tape 300 even at a recording magnetic field strength which is slightly smaller than a minimum recording magnetic field strength required for the recording magnetic field M2 generated at the protrusion 103a on the upper magnetic core layer 103 positioned on the trailing side to reverse the magnetization in the metal magnetic film 302 of the metal evaporated tape 300.

From the above discussion, the reason why the total width of the recording bit 90 recorded by the thin film magnetic head 60 shown in FIG. 13 became larger than those recorded by the other heads is considered owing to that the recording magnetic field generated at the protrusion 24a on the lower magnetic core layer 24 positioned on the leading side could reverse the magnetization in the magnetic layer of the deposition tape even at a recording magnetic field strength which was slightly smaller than that of the recording magnetic field generated at the protrusion 25a on the upper magnetic core layer 25 disposed on the trailing side.

On the other hand, in the thin film magnetic head 40 according to the preferred embodiment of the present invention shown in FIG. 12, likewise in the thin film magnetic head 60 shown in FIG. 13, the track width Tw1 of the top side adjacent to the magnetic gap G of the protrusion 24a on the lower magnetic core layer 24 is larger than the track width Tw2 of the top side adjacent to the magnetic gap G of the protrusion 25a on the upper magnetic core layer 25, and is completely the same length as the track width Tw1 of the top side adjacent to the magnetic gap G of the protrusion 24a on the lower magnetic core layer 24 in the thin film magnetic head 60. However, it should be noted that as the protrusion 24a on the lower magnetic core layer 24 is positioned on the trailing side in this thin film magnetic head 40, a total width of a recording bit 80 shown in FIG. 16 is contained within a narrowest value of 2.03 $\mu$m.

As a result, advantageously, by use of the thin film magnetic heads 20, 40 according to the preferred embodiment of the present invention wherein the protrusion 25a on the upper magnetic core layer 25 is disposed on the leading side whereas the protrusion 24a on the lower magnetic core layer 24 is disposed on the trailing side, the adverse effect of the side erasing can be substantially suppressed, in particular, in the metal evaporated tape.

It should be noted that the preferred embodiments of the present invention described above are only exemplary and not limited to the arrangements of the above thin film magnetic heads 20, 40, and any other arrangements, modifications or changes thereof should be construed to be within the scope of the invention, provided that at least one side surface in the direction of the track width of the protrusion 24a on the lower magnetic core layer 24 positioned on the trailing side has the inclined side surface inclined at the angle equal to or greater than the azimuth angle θ, and that the one edge of the top side adjacent to the magnetic gap G of the protrusion 25a on the upper magnetic core layer 25 positioned on the leading side is disposed on the line drawn extending from the inclined side surface described above. In this case, preferably, the track width Tw2 of the top side adjacent to the magnetic gap G of the protrusion 25a on the upper magnetic core layer 25 positioned on the leading side is equal to or smaller than the track width Tw1 of the top side adjacent to the magnetic gap G of the protrusion 24a on the lower magnetic core layer 24 positioned on the trailing side.

As the thin film magnetic head according to the preferred embodiment of the present invention described hereinabove can be fabricated by forming the lower magnetic core layer 24 having a broader width and to be positioned on the trailing side on the substrate using the conventional thin film process, then, forming the upper magnetic core layer 25 having a narrower width and to be positioned on the leading side thereon, advantageously, the manufacture thereof becomes easy. Further, even in the case where the side surface of the protrusion 25a on the upper magnetic core layer 25 which coincides with the line drawn from the inclined side surface of the protrusion 24a on the lower magnetic core layer 24 has also an inclined side surface inclined at an angle equal to or greater than the azimuth angle θ, as these inclined side surfaces reside on the same line, these shapes can easily be fabricated.

What is claimed is:

1. An inductive thin film magnetic head, in which: at least a lower magnetic core layer, a nonmagnetic layer and an upper magnetic core layer are laminated on a substrate; each of said lower magnetic core layer and said upper magnetic core layer has a protrusion at an edge portion thereof on a side of a medium facing plane opposed to a magnetic recording medium, which protrudes with a predetermined track width corresponding to a recording track to be formed on said magnetic recording medium; a magnetic gap is formed by disposing each of said protrusions adjacent to each other in a direction of lamination via said nonmagnetic layer; said lower magnetic core layer and said upper magnetic core layer are connected at other edge portions thereof remote from said medium facing plane in a direction of depth therefrom; and a thin film coil is wound around said other edge portions connected, wherein:

said magnetic gap is disposed on said medium facing plane slantingly relative to a direction orthogonal to a scanning direction of said head corresponding to an azimuth angle, said upper magnetic core layer is disposed on a leading side in the scanning direction of said head, preceding said lower magnetic core layer, said protrusion on the side of said lower magnetic core layer has an inclined side surface inclined at an angle equal to or greater than said azimuth angle at least on one side in a direction of a track width thereof, and at least one edge of a side adjacent to said magnetic gap of the protrusion of said upper magnetic core layer is aligned on a line drawn extending from said inclined side surface of said protrusion on the lower magnetic core layer.

2. A thin film magnetic head according to claim 1, wherein the protrusion of said upper magnetic core layer has an inclined side surface inclined at an angle equal to or greater than said azimuth angle at least on one side surface thereof aligned on said line extending from said inclined side surface of the protrusion on said lower magnetic core layer.

3. A thin film magnetic head according to claim 1, wherein a track width of the protrusion on said upper magnetic core layer on a side thereof adjacent to said magnetic gap is equal to or smaller than a track width of the protrusion on said lower magnetic core layer on a side thereof adjacent to said magnetic gap.

4. A thin film magnetic head according to claim 1, wherein said thin film magnetic head is mounted on a rotary drum and records signals on a tape-shaped magnetic recording medium in a helical scan manner while making sliding contact therewith.

5. A magnetic tape drive including means for running a magnetic tape and a recording head for recording signals on the magnetic tape driven by said means for running the magnetic tape while making sliding contact therewith, wherein said recording head is an inductive thin film magnetic head, in which: at least a lower magnetic core layer, a nonmagnetic layer and an upper magnetic core layer are laminated on a substrate; each of said lower magnetic core layer and said upper magnetic core layer has a protrusion on one end portion thereof on a side of a medium sliding contact plane to make a sliding contact with said magnetic tape, which protrudes with a predetermined track width corresponding to a recording track to be formed on said magnetic tape; a magnetic gap is formed by disposing each of said protrusions adjacent to each other via said nonmagnetic layer in a direction of lamination; said lower magnetic core layer and said upper magnetic core layer are connected at the other ends thereof remote from said medium sliding contact plane in a direction of depth therefrom; and a thin film coil is wound around said other ends thereof connected, wherein:

said thin film magnetic head comprises:

said magnetic gap which is disposed slantingly on said medium facing plane relative to a direction orthogonal to a scanning direction of said head corresponding to an azimuth angle;

said upper magnetic core layer which is disposed on a leading side in the scanning direction of said head preceding said lower magnetic core layer;

said protrusion on said lower magnetic core layer which has an inclined side surface inclined at an angle equal to or greater than said azimuth angle at least on one side thereof in a direction of a track width; and said protrusion on said upper magnetic core layer which has at least one edge of a side thereof adjacent to said magnetic gap being aligned on a line drawn extending from said inclined side surface of said protrusion on said lower magnetic core layer.

6. A magnetic tape drive according to claim 5, wherein said protrusion on said upper magnetic core layer has an inclined side surface inclined at an angle equal to or greater than said azimuth angle at least on one side surface thereof which is aligned on a line extending from said inclined side surface of said protrusion on said lower magnetic core layer.

7. A magnetic tape drive according to claim 5, wherein a track width on a side adjacent to said magnetic gap of said protrusion on said upper magnetic core layer is equal to or smaller than a track width on a side adjacent to said magnetic gap of said protrusion on said lower magnetic core layer.

8. A magnetic tape drive according to claim 5, wherein said means for running said magnetic tape includes a rotary drum which is rotated on said magnetic tape wound around an outer periphery thereof, and wherein said thin film magnetic head is mounted on said rotary drum for recording signals on said magnetic tape in a helical scan manner while making sliding contact therewith.

* * * * *